(12) United States Patent
Morris et al.

(10) Patent No.: US 10,722,826 B2
(45) Date of Patent: *Jul. 28, 2020

(54) FILTER ASSEMBLY INCLUDING FLOW CAP

(71) Applicant: CATERPILLAR INC., Peoria, IL (US)

(72) Inventors: Bryant A. Morris, Peoria, IL (US);
Jeffrey R. Ries, Metamora, IL (US);
Darrell L. Morehouse, III, Dunlap, IL (US); Brian J. Sutton, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 1292 days.

This patent is subject to a terminal disclaimer.

(21) Appl. No.: 14/605,533

(22) Filed: Jan. 26, 2015

(65) Prior Publication Data

US 2016/0214038 A1 Jul. 28, 2016

(51) Int. Cl.
| B01D 29/11 | (2006.01) |
| B01D 29/23 | (2006.01) |
| B01D 35/00 | (2006.01) |
| B01D 35/30 | (2006.01) |
| B01D 36/00 | (2006.01) |
| B01D 29/90 | (2006.01) |

(52) U.S. Cl.
CPC .......... B01D 29/117 (2013.01); B01D 29/232 (2013.01); B01D 29/90 (2013.01); B01D 35/005 (2013.01); B01D 35/30 (2013.01); B01D 36/005 (2013.01); B01D 36/006 (2013.01); B01D 2201/291 (2013.01); B01D 2201/302 (2013.01); B01D 2201/342 (2013.01)

(58) Field of Classification Search
None
See application file for complete search history.

(56) References Cited

U.S. PATENT DOCUMENTS

| 5,606,989 A | 3/1997 | Roll et al. |
| 5,750,024 A | 5/1998 | Spearman |
| 6,139,738 A | 10/2000 | Maxwell |

(Continued)

FOREIGN PATENT DOCUMENTS

| DE | 102011119868 | 6/2013 |
| FR | 2 829 703 A1 | 3/2003 |

(Continued)

*Primary Examiner* — Robert J Popovics
(74) *Attorney, Agent, or Firm* — Finnegan, Henderson, Farabow, Garrett & Dunner, LLP

(57) ABSTRACT

A filter assembly may include a canister and a filter element received in the canister. The filter element may include filter media configured to promote separation of a first fluid from a second fluid having different characteristics than the first fluid as fluid passes through the filter media. The filter element may further include a first end cap, a second end cap, and a tubular member extending between the first and second end caps. The filter assembly may further include a flow cap associated with the first end cap of the filter element. The flow cap may include an inlet portion configured to provide flow communication between an inlet port of a filter base and the tubular member of the filter element, and an outlet portion configured to provide flow communication between an outlet port of the filter base and an exterior portion of the filter element.

11 Claims, 6 Drawing Sheets

(56) References Cited

U.S. PATENT DOCUMENTS

| | | | |
|---|---|---|---|
| 8,419,938 B2 | 4/2013 | Ries et al. | |
| 9,546,626 B2 * | 1/2017 | LaForge | B01D 36/003 |
| 9,789,426 B2 * | 10/2017 | Morris | B01D 35/005 |
| 2006/0219626 A1 | 10/2006 | Dworatzek et al. | |
| 2008/0245719 A1 | 10/2008 | Beard et al. | |
| 2012/0080372 A1 * | 4/2012 | Ries | B01D 36/006 |
| | | | 210/440 |
| 2013/0146524 A1 | 6/2013 | Veit et al. | |
| 2014/0102967 A1 | 4/2014 | Blunt et al. | |
| 2014/0251889 A1 * | 9/2014 | LaForge | B01D 36/003 |
| | | | 210/236 |
| 2016/0214038 A1 * | 7/2016 | Morris | B01D 29/117 |
| 2016/0214040 A1 * | 7/2016 | Morris | B01D 35/005 |

FOREIGN PATENT DOCUMENTS

| | | |
|---|---|---|
| GB | 950333 A | 2/1964 |
| GB | 1088029 A | 10/1967 |
| WO | WO 2014/059184 A1 | 4/2014 |
| WO | WO 2014/082762 A1 | 6/2014 |

\* cited by examiner

FILTER ASSEMBLY INCLUDING FLOW CAP

TECHNICAL FIELD

The present disclosure relates to a flow cap for a filter assembly and a filter assembly including a flow cap, and more particularly, to a flow cap and filter assembly for separating fluids.

BACKGROUND

Engines, including compression-ignition engines, spark-ignition engines, gasoline engines, gaseous fuel-powered engines, and other internal combustion engines, may operate more effectively with fuel from which contaminates have been removed prior to the fuel reaching a combustion chamber of the engine. In particular, fuel contaminates, if not removed, may lead to undesirable operation of the engine and/or may increase the wear rate of engine components, such as fuel system components.

Effective removal of contaminates from the fuel system of a compression-ignition engine may be particularly important. In some compression-ignition engines, air is compressed in a combustion chamber, thereby increasing the temperature and pressure of the air, such that when fuel is supplied to the combustion chamber, the fuel and air mixture ignite. If water and/or other contaminates are not removed from the fuel, the contaminates may interfere with and/or damage, for example, fuel injectors, which may have orifices manufactured to exacting tolerances and shapes for improving the efficiency of combustion and/or reducing undesirable exhaust emissions. Moreover, the presence of water in the fuel system may cause considerable engine damage and/or corrosion in the injection system.

Fuel filtration systems serve to remove contaminates from the fuel. For example, some conventional fuel systems may include a fuel filter, which removes water and large particulate matter, and another fuel filter, which removes a significant portion of remaining particulate matter (e.g., smaller contaminates), such as fine particulate matter. However, water may be particularly difficult to separate from fuel under certain circumstances. For example, if water is emulsified in the fuel it may be relatively more difficult to separate from fuel. In addition, for some types of fuel, such as, for example, fuel having a bio-component, it may be relatively more difficult to separate the water from the fuel. Therefore, it may be desirable to provide a filter assembly having an improved ability to separate water from fuel.

An attempt to provide desired filtration is described in U.S. Patent Application Publication No. US 2013/0146524 A1 ("the '524 publication") to Veit et al., published Jun. 13, 2013. Specifically, the '524 publication discloses a fuel filter having a housing with a fuel inlet, a fuel outlet for cleaned fuel, and a water outlet for water separated from the fuel. A filter element is arranged in the housing and separates the fuel inlet and fuel outlet. The filter element has a filter medium configured as a hollow member for filtering the fuel and a hydrophobic fuel-permeable separating medium embodied as a hollow member for separating water from the fuel. The separating medium is arranged downstream of the filter medium and is positioned inside the filter medium or surrounds the filter medium. Between the filter medium and the separating medium, a precipitation slot is provided having a conical shape and being connected with the water outlet.

Although the fuel filter of the '524 publication purports to separate water from fuel, it may not provide sufficient separation under circumstances where the fuel is emulsified or includes bio-components. Thus, it may not provide a desirable level of fuel filtration.

The flow caps and filter assemblies disclosed herein may be directed to mitigating or overcoming one or more of the possible drawbacks set forth above.

SUMMARY

According to a first aspect, a flow cap configured to provide flow communication with an interior portion of a filter element and an exterior portion of the filter element may include an outer ring and an inner ring associated with the outer ring. The flow cap may also include an inlet portion configured to provide flow communication between an inlet port of a filter base and an interior portion of a filter element. The inlet portion may include a first portion of the outer ring, a first portion of the inner ring, and a plurality of arms extending between the first portion of the outer ring and the first portion of the inner ring. The arms may at least partially define an inlet aperture configured to provide flow communication between the inlet port of the filter base and the interior portion of the filter element. The flow cap may further include an outlet portion configured to provide flow communication between an outlet port of the filter base and an exterior portion of the filter element. The outlet portion may include a second portion of the outer ring, a second portion of the inner ring, and a plate associated with the inner ring. The plate may include an outlet aperture providing flow communication between the outlet port of the filter base and the exterior portion of the filter element. The outlet portion may also include a wall extending between the second portion of the outer ring and the second portion of the inner ring, wherein the plate and the wall prevent flow communication between fluid entering the inlet portion and fluid entering the outlet portion.

According to a further aspect, a flow cap configured to provide flow communication with an interior portion of a filter element and an exterior portion of the filter element may include an inlet section and an outlet section associated with the inlet section. The flow cap may include an inlet portion defined by the inlet section and configured to provide flow communication between an inlet port of a filter base and an interior portion of a filter element. The inlet portion may include an inlet aperture configured to provide flow communication between the inlet port of the filter base and the interior portion of the filter element. The flow cap may further include an outlet portion defined by the outlet section and configured to provide flow communication between an outlet port of the filter base and an exterior portion of the filter element. The outlet portion may include an outlet aperture providing flow communication between the outlet port of the filter base and the exterior portion of the filter element. The inlet portion of the flow cap may be configured to provide flow communication between the inlet port of a filter base and the interior portion of the filter element in a direction substantially toward a central portion of the flow cap, and the outlet portion of the flow cap may be configured to provide flow communication between the outlet port of the filter base and the exterior portion of the filter element in a directional substantially toward the central portion of the flow cap.

According to another aspect, a method of directing fluid through a filter element via a flow cap may include receiving fluid from an inlet port of a filter base in the flow cap, and directing fluid received from the inlet port toward an interior portion of the filter element via the flow cap. The method may further include directing fluid from the interior portion of the filter element through the filter element to an exterior portion of the filter element, and directing fluid from the exterior portion of the filter element to an outlet port of the filter base via the flow cap. Directing fluid received from the inlet port toward the interior portion of the filter element may include directing the fluid substantially toward a central portion of the flow cap, and directing fluid from the exterior portion of the filter element to the outlet port of the filter base may include directing the fluid substantially toward the central portion of the flow cap.

According to a further aspect, a filter assembly may include a canister having a longitudinal axis and a filter element received in the canister. The filter element may include filter media configured to promote separation of a first fluid from a second fluid having different characteristics than the first fluid as fluid passes through the filter media. The filter element may further include a first end cap associated with a first end of the filter media, a second end cap associated with a second end of the filter media, and a tubular member extending between the first and second end caps. The tubular member may include a plurality of apertures, and the filter media may extend between the first end cap and the second end cap and around an exterior surface of the tubular member. The filter assembly may further include a flow cap associated with the first end cap of the filter element. The flow cap may include an inlet portion configured to provide flow communication between an inlet port of a filter base and the tubular member of the filter element, and an outlet portion configured to provide flow communication between an outlet port of the filter base and an exterior portion of the filter element.

According to a further aspect, a filter assembly may include a canister having a longitudinal axis and a filter element received in the canister. The filter element may include filter media configured to promote separation of a first fluid from a second fluid having different characteristics than the first fluid as fluid passes through the filter media. The filter media may include an interior portion, an exterior portion, a first end cap associated with a first end of the filter media, and a second end cap associated with a second end of the filter media. The filter assembly may also include a flow cap associated with the first end cap of the filter element. The flow cap may include an inlet portion configured to provide flow communication between an inlet port of a filter base and the interior portion of the filter media, and an outlet portion configured to provide flow communication between an outlet port of the filter base and an exterior portion of the filter media. The filter assembly may also include a collection bowl coupled to an end of the canister remote from the flow cap, wherein the collection bowl is configured to receive at least a portion of the second fluid. The filter element may be configured such that fluid entering the interior portion of the filter media via the flow cap flows in a first direction longitudinally toward the second end cap and thereafter into the filter media, and after the fluid passes into the filter media, the first fluid flows in a second direction between the exterior of the filter media and the canister longitudinally toward the flow cap.

According to another aspect, a method of separating a first fluid from a second fluid having different characteristics than the first fluid may include receiving fluid from an inlet port of a filter base in a flow cap, and directing fluid received from the inlet port toward an interior portion of a filter element via the flow cap. The method may also include directing fluid from the interior portion of the filter element into filter media of the filter element, wherein the filter media is configured to promote separation of the first fluid from the second fluid as fluid passes through the filter media to an exterior portion of the filter element. The method may further include directing the first fluid from the exterior portion of the filter element to an outlet port of the filter base via the flow cap, and directing at least a portion of the second fluid from the filter media to a collection bowl. Directing fluid received from the inlet port toward the interior portion of the filter element may include directing the fluid substantially toward a central portion of the flow cap, and directing fluid from the exterior portion of the filter element to the outlet port of the filter base may include directing the fluid substantially toward the central portion of the flow cap.

DETAILED DESCRIPTION

FIGS. 1-4 illustrate an exemplary embodiment of a filter assembly 10. Filter assembly 10 shown in FIGS. 1-4 may be used to filter fluids such as, for example, fuel, lubricants, coolants, and hydraulic fluid used by machines. According to some embodiments, filter assembly 10 may be used as a fuel/water separator filter, as explained in more detail below, and/or as an air filter. Other uses may be contemplated. For example, FIGS. 1-4 show an exemplary embodiment of filter assembly 10 that may provide improved separation of a first fluid from a second fluid having different characteristics than the first fluid (e.g., separating water from fuel).

Exemplary filter assembly 10 shown in FIGS. 1-4 includes a filter base 12 configured to couple filter assembly 10 to a machine, a canister 14 configured to be coupled to filter base 12, and a filter element 16 configured to be received in canister 14. According to some embodiments, for example, the embodiment shown in FIGS. 1-4, canister 14 and filter element 16 are not formed as a single part. Rather, canister 14 and filter element 16 are separate parts, and filter element 16 is configured to be selectively insertable into and removable from canister 14 in a "drop-in" or "cartridge" fashion during servicing and/or replacement.

Figure 4:
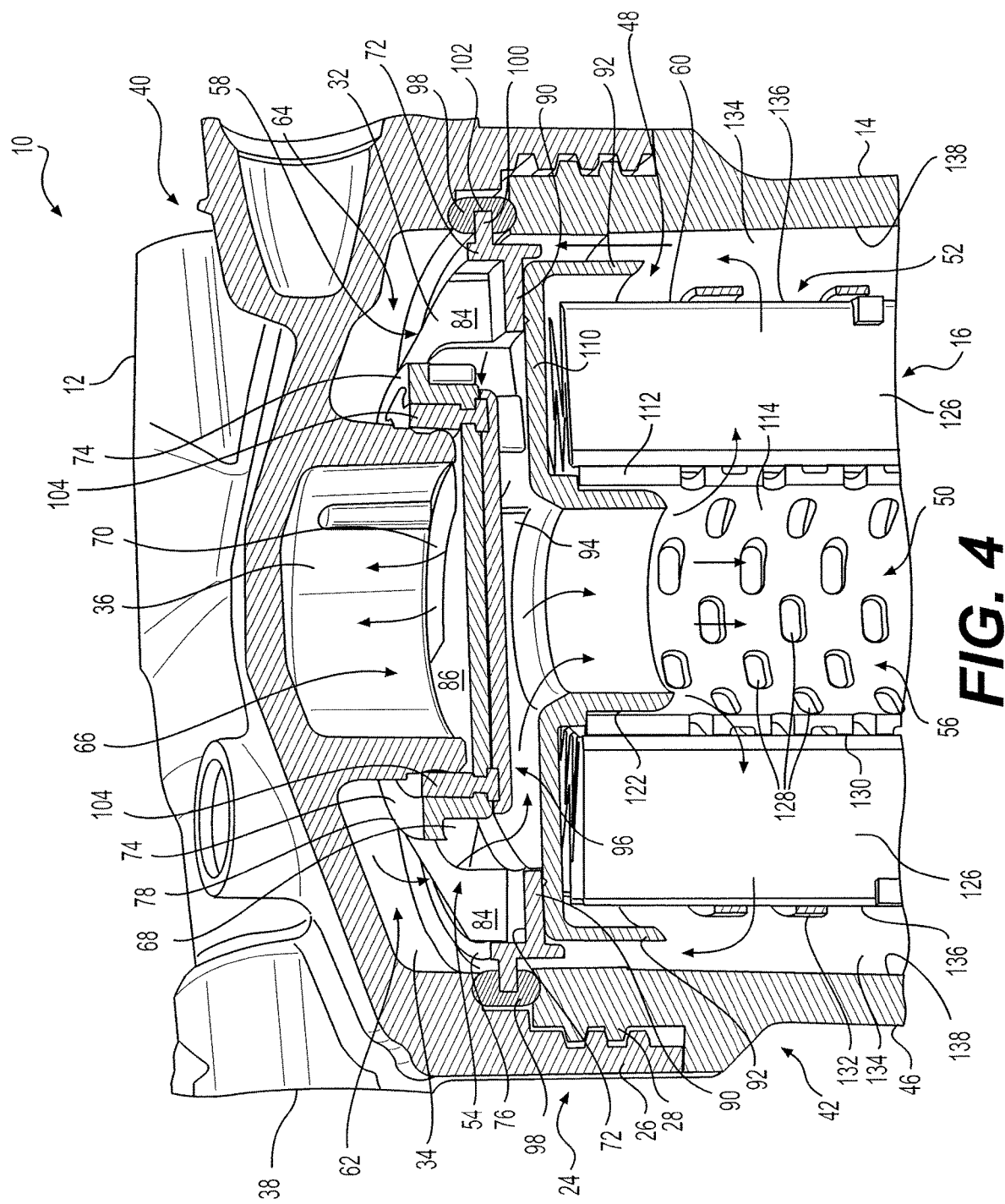
FIG. 4 is a partial side section view of the exemplary embodiment shown in FIG. 1.

Exemplary filter base 12 includes a mounting bracket 18 having at least one hole 20 (e.g., three holes 20) for receiving a fastener for coupling filter base 12 to a machine. Other coupling configurations are contemplated. Exemplary filter base 12 also includes an extension 22 and a receiver 24 configured to be coupled to canister 14. Extension 22 serves to space receiver 24 from mounting bracket 18 to provide clearance for canister 14 and filter element 16. For example, receiver 24 may include a coupling portion 26 (e.g., including a threaded portion) configured to engage with a complimentary coupling portion 28 (e.g., including a threaded portion) of canister 14, for example, as shown in FIG. 4.

Exemplary receiver 24 of filter base 12 also includes tubular portion 30 configured to sealingly engage with a portion of a flow cap 32 configured to be positioned between receiver 24 of filter base 12 and filter element 16 when filter element 16 and canister 14 are coupled to filter base 12.

In the exemplary embodiment shown, coupling portion 26 and tubular portion 30 of receiver 24 and flow cap 32 define an inlet cavity 34 (e.g., a substantially annular cavity) and an outlet cavity 36 (e.g., a substantially cylindrical cavity) radially internal to with respect to inlet cavity 34. Exemplary receiver 24 of filter base 12 includes an inlet port 38 configured to be in flow communication with inlet cavity 34, and an outlet port 40 configured to be in flow communication with outlet cavity 36. Exemplary inlet port 38 is configured to be coupled to a fluid conduit of a fluid system, such as, for example, a fuel system, a lubrication system, a hydraulic system, or a coolant system, such that it receives fluid for filtration in filter assembly 10. Exemplary outlet port 40 is configured to be coupled to a fluid conduit of the fluid system, such that fluid exiting filter assembly 10 returns to the fluid system following filtration.

Figure 2:
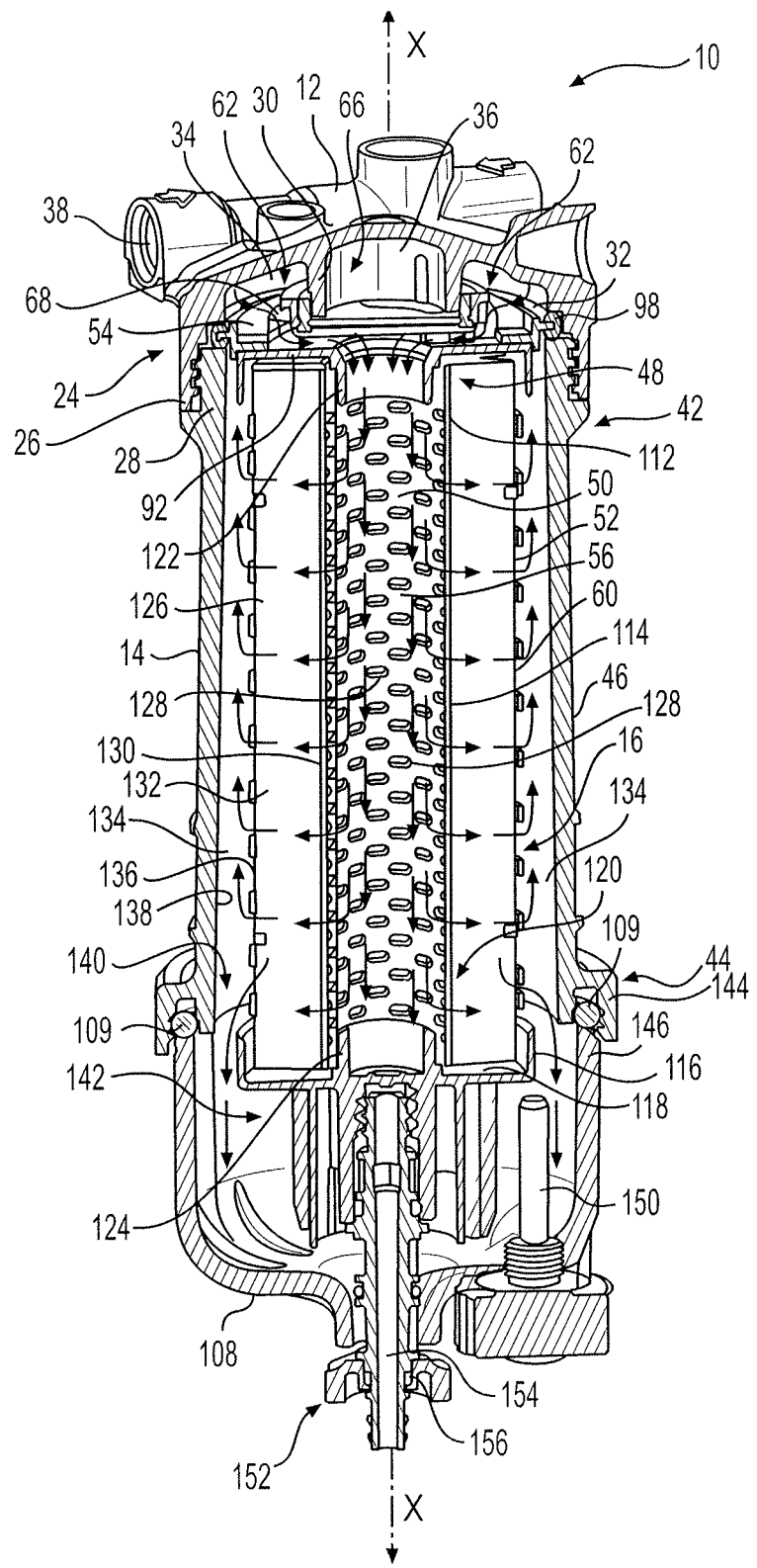
FIG. 2 is a side section view from a first perspective of the exemplary embodiment shown in FIG. 1.

Exemplary filter assembly 10 defines a longitudinal axis X, and exemplary filter base 12, canister 14, flow cap 32, and filter element 16 define respective longitudinal axes that may be substantially parallel to (e.g., co-linear with) longitudinal axis X of filter assembly 10. Exemplary canister 14 includes a first end 42, an oppositely-disposed second end 44, and a body portion 46 extending therebetween. As shown in FIG. 2, first end 42 and second end 44 are open ends.

Figure 5:
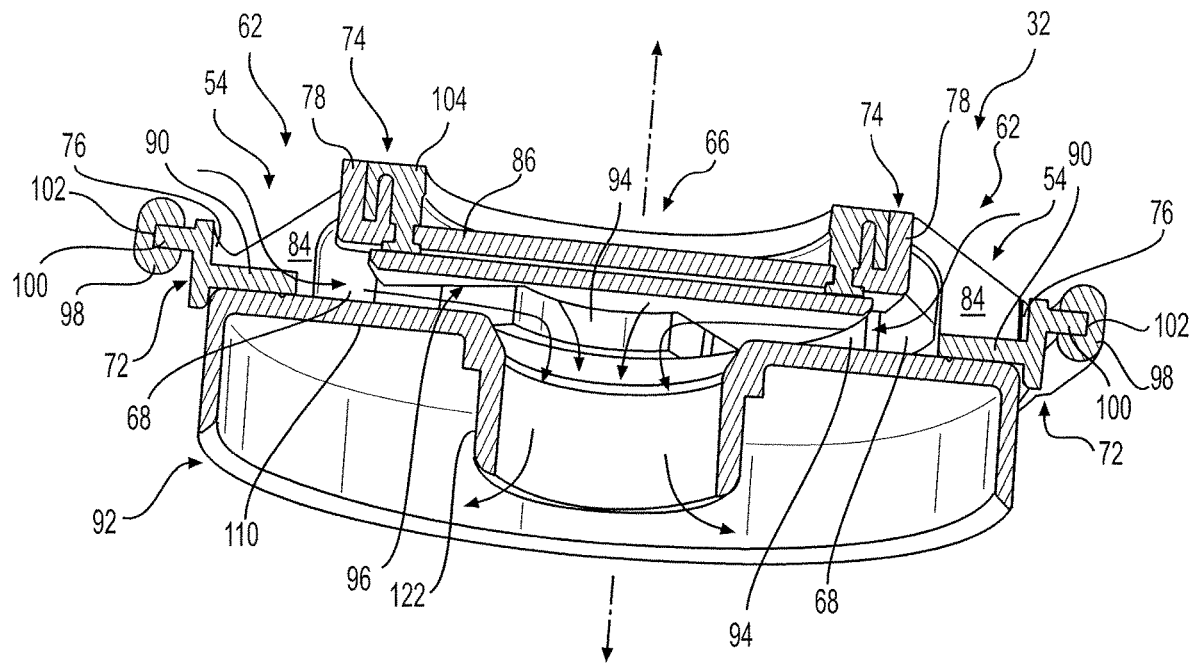
FIG. 5 is a side section view from a first perspective of an exemplary embodiment of a flow cap.
Figure 6:
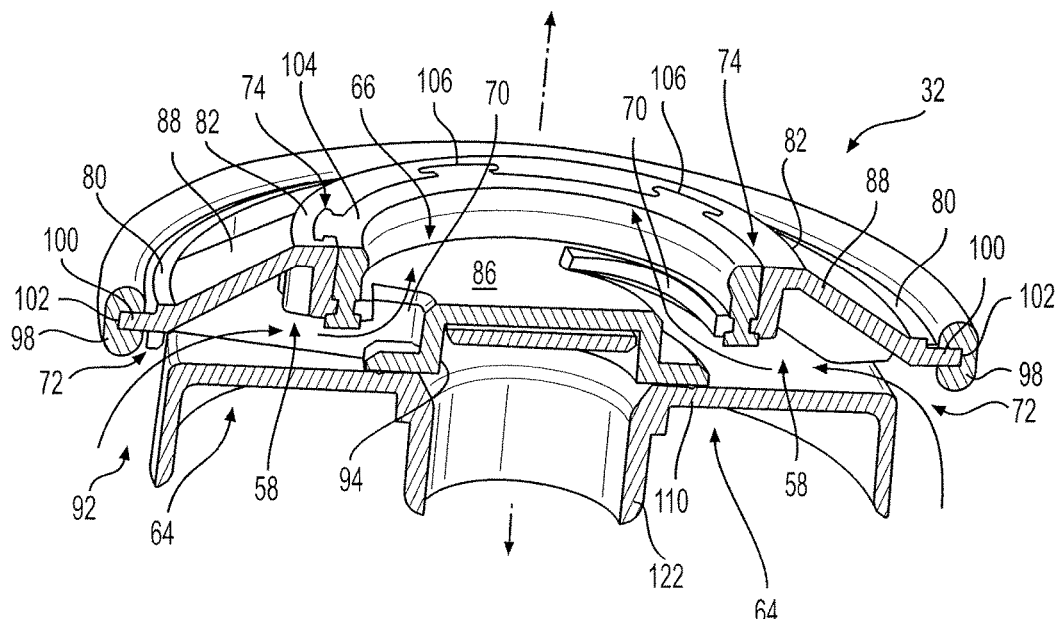
FIG. 6 is a side section view from a second perspective of the exemplary embodiment of flow cap shown in FIG. 5.

As shown in FIGS. 4-6, exemplary flow cap 32 is configured to provide an interface between filter base 12 and a first end 48 of filter element 16. In particular, exemplary flow cap 32 is configured to provide flow communication between filter base 12 and an interior portion 50 of filter element 16 and an exterior portion 52 of filter element 16. As shown in FIGS. 4 and 5, exemplary flow cap 32 includes an inlet portion 54 configured to provide flow communication between inlet port 38 of filter base 12 and interior portion 50 of filter element 16 (e.g., a cylindrical inner chamber 56 of filter element 16). As shown in FIGS. 4 and 6, exemplary flow cap 32 also includes an outlet portion 58 configured to provide flow communication between outlet port 40 of filter base 12 and exterior portion 52 of filter element 16 (e.g., a cylindrical exterior surface 60 of filter element 16).

For example, the exemplary flow cap 32 shown in FIGS. 2-7 has a substantially circular cross-section perpendicular to the longitudinal axis of flow cap 32, which is substantially parallel with respect to (e.g., co-linear with respect to) longitudinal axis X of filter assembly 10 when flow cap 32 is assembled with filter base 12, canister 14, and filter element 16. As shown, flow cap 32 includes an inlet section 62 and an outlet section 64 associated with inlet section 62. For example, in the exemplary embodiment shown, inlet section 62 is located at a circumferentially different position than outlet section 64 relative to flow cap 32. In particular, inlet section 62 substantially corresponds to a first sector of flow cap 32, and outlet section 64 substantially corresponds to a second sector of flow cap 32. According to some embodiments, for example, as shown, flow cap 32 includes two circumferentially opposed inlet sections 62 circumferentially spaced from one another by circumferentially opposed outlet sections 64. It is contemplated that flow cap 32 may have different numbers of inlet sections 62 and/or outlet sections 64, based on, for example, various flow considerations and desired flow characteristics.

In the exemplary flow cap 32 shown (see FIGS. 4 and 5), inlet portion 54 of flow cap 32 is defined by inlet section 62, and inlet portion 54 is configured to provide flow communication between inlet port 38 of filter base 12 and interior portion 50 of filter element 16. For example, exemplary inlet portion 54 includes an inlet aperture 68 configured to provide flow communication between inlet port 38 of filter base 12 and interior portion 50 of filter element 16. As shown in FIGS. 4 and 6, exemplary outlet portion 58 of flow cap 32 is defined by outlet section 64, and outlet portion 58 is configured to provide flow communication between outlet port 40 of filter base 12 and exterior portion 60 of filter element 16. For example, exemplary outlet portion 58 includes an outlet aperture 70 providing flow communication between outlet port 40 of filter base 12 and exterior portion 60 of filter element 16. In the exemplary embodiment shown, inlet portion 54 of flow cap 32 is configured to provide flow communication between inlet port 38 of filter base 12 and interior portion 50 of filter element 16 in a direction substantially toward central portion 66 of flow cap 32. Similarly, exemplary outlet portion 58 of flow cap 32 is configured to provide flow communication between outlet port 40 of filter base 12 and exterior portion 52 of filter element 12 in a directional substantially toward central portion 66 of flow cap 32.

As shown, exemplary flow cap 32 includes an outer ring 72 and an inner ring 74 associated with outer ring 72 and interior with respect to outer ring 72 (e.g., radially interior with respect to outer ring 72). Inlet portion 54 of flow cap 32 includes a first portion 76 of outer ring 72 and a first portion 78 of inner ring 74. Outlet portion 58 of flow cap 32 includes a second portion 80 of outer ring 72 and a second portion 82 of inner ring 74.

Exemplary inlet portion 54 of flow cap 32 includes a plurality of arms 84 extending between first portion 76 of outer ring 72 and first portion 78 of inner ring 74. Arms 84 at least partially define one or more of inlet apertures 68 configured to provide flow communication between inlet port 38 of filter base 12 and interior portion 50 of filter element 16. Exemplary flow cap 32 also includes a plate 86 associated with inner ring 74, and plate 86 includes one more of outlet apertures 70 of outlet portion 58. Outlet portion 58 also includes a wall 88 extending between second portion 80 of outer ring 72 and second portion 82 of inner ring 74. In the example shown in FIG. 4, plate 86 is a substantially circular disk, and outlet aperture 70 is a sector-shaped aperture through the thickness of plate 86 (e.g., thickness in the longitudinal axis-direction of flow cap 32). According to the exemplary embodiment shown, plate 86 and wall 88 prevent flow communication between fluid entering inlet portion 54 of flow cap 32 and fluid entering outlet portion 58 of flow cap 32.

According to the exemplary embodiment shown, flow cap 32 has a substantially circular cross-section perpendicular to a longitudinal axis of flow cap 32, and arms 84 of inlet portion 54 extend radially between first portion 76 of outer ring 72 and first portion of inner ring 74. Similarly, exemplary wall 88 of outlet portion 58 extends radially between second portion 80 of outer ring 72 and second portion 82 of inner ring 74 (e.g., and obliquely with respect to the longitudinal axis of flow cap 32).

According to some embodiments, first portion 76 of outer ring 72 includes an inner portion 90 configured to abut against a first end cap 92 associated with filter element 16 (see FIG. 4). Inner portion 90 is configured to prevent flow communication between inlet aperture 68 and exterior portion 52 of filter element 16. According to the exemplary embodiment shown, second portion 80 of outer ring 72 does not include a corresponding inner portion of outer ring 72, and flow communication is provided between outlet aperture 70 and exterior portion 52 of filter element 16.

In the exemplary embodiment shown, plate 86 partially defines outlet cavity 36 (e.g., with tubular portion 30 of filter base 12), which is in flow communication with outlet aperture 70 in plate 86. Flow cap 32 further includes a flange 94 (e.g., forming a substantially cylindrical-shaped wall) extending from a side of plate 86 opposite outlet cavity 36, and flange 94 prevents flow communication between fluid entering interior portion 50 of filter element 16 and fluid flowing through outlet aperture 70 to outlet cavity 36. Flange 94 is also configured to space plate 86 from first end cap 92 associated with filter element 16. According to the exemplary embodiment shown, flange 94 includes one or more openings 96 configured to provide flow communication between one or more of inlet apertures 68 and interior portion 50 of filter element 16.

Exemplary filter assembly 10 also includes a seal element 98 (e.g., an annular o-ring seal) associated with outer ring 72 of flow cap 32 and configured to provide a fluid seal between outer ring 72 and at least one of filter base 12 and canister 14. For example, as shown in FIG. 4, outer ring 72 includes an extension 100 extending outwardly from outer ring 72 (e.g., radially outwardly), and seal element 98 includes a recess 102 configured to receive extension 100. In the exemplary embodiment shown, seal element 98 is sandwiched between a portion of filter base 12 and a corresponding end portion of canister 14 when filter element 16 and flow cap 32 are assembled to one another and received in canister 14, and canister 14 is coupled to filter base 12.

Figure 3:
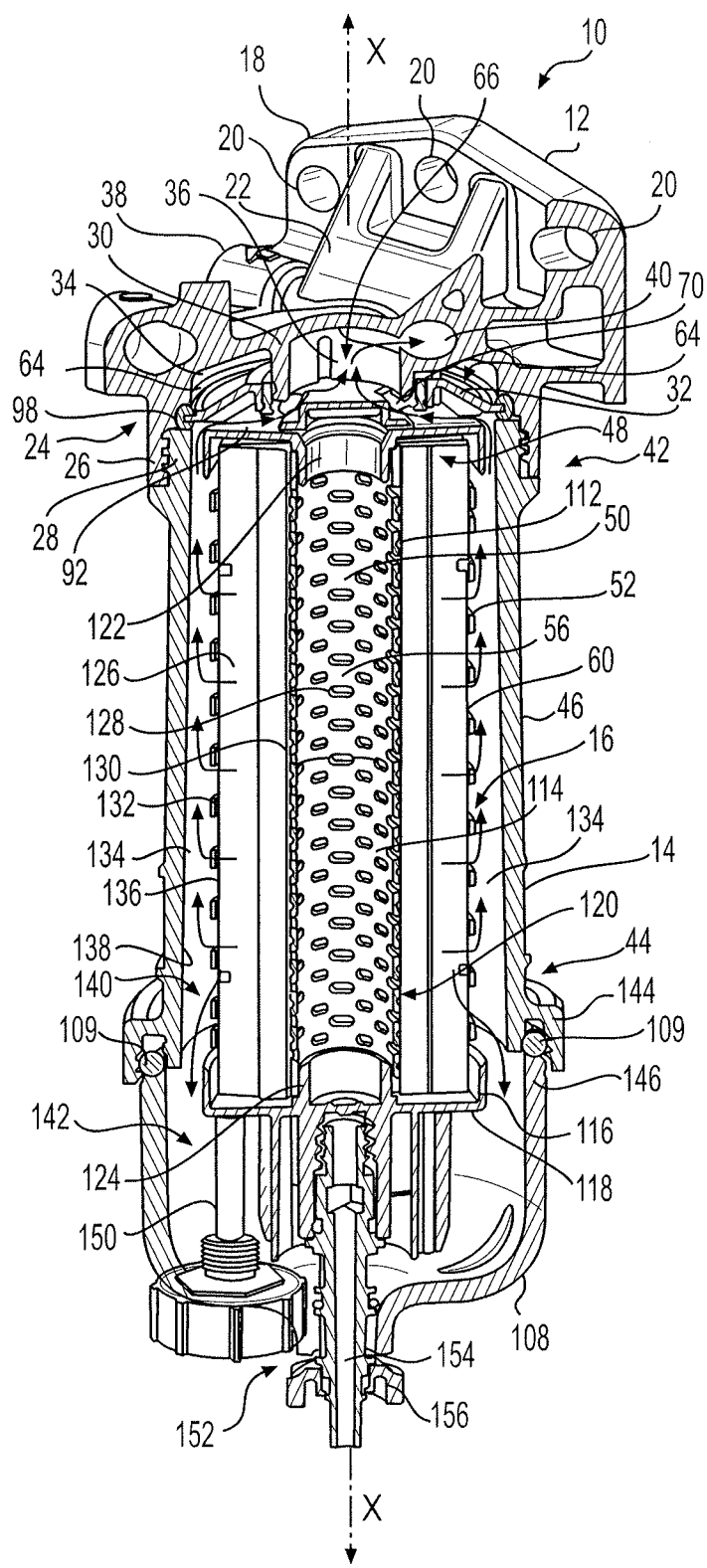
FIG. 3 is a side section view from a second perspective of the exemplary embodiment shown in FIG. 1.

Exemplary filter assembly 10 also includes a seal element 104 associated with inner ring 74 of flow cap 32 and configured to prevent flow of fluid between inlet port 38 of filter base 12 and outlet port 40 of filter base 12 unless the fluid passes through filter element 16, for example, as fluid flows from inlet port 38, into inlet cavity 34, through inlet aperture 68, into interior portion 50 of filter element 16, through filter element 16 to exterior portion 52 of filter element 16, through outlet aperture 70 of flow cap 32, into outlet cavity 36, and through outlet port 40 (see FIGS. 2 and 3). Exemplary seal element 104 is a substantially cylindrical-shaped seal sandwiched between an inner surface of inner ring 74 of flow cap 32 and an outer surface of tubular portion 30 of filter base 12. According to some embodiments, seal element 104 may be molded onto an inner surface of inner ring 74, and/or the inner surface may include one or more recesses 106 (see FIGS. 6 and 7) configured to receive corresponding portions of seal element 104.

According to some embodiments, flow cap 32 may be used to direct the flow of fluid into and out of filter element 16. For example, as shown by the arrows in FIGS. 2 and 3, a method of directing fluid through filter element 16 via flow cap 32 may include receiving fluid from inlet port 38 of filter base 12 in flow cap 32, and directing fluid received from inlet port 38 toward interior portion 50 of filter element 16 via flow cap 32. The method may further include directing fluid from interior portion 50 of filter element 16 through filter element 16 to exterior portion 52 of filter element 16, and directing fluid from exterior portion 52 of filter element 16 to outlet port 40 of filter base 12 via flow cap 32, wherein directing fluid received from inlet port 38 toward interior portion 50 of filter element 16 includes directing the fluid substantially toward central portion 66 of flow cap 32. According to some embodiments, directing fluid from exterior portion 52 of filter element 16 to outlet port 40 of filter base 12 also includes directing the fluid substantially toward central portion 66 of flow cap 32.

As noted above, some embodiments of flow cap 32 have a substantially circular cross-section perpendicular to a longitudinal axis of flow cap 32, and directing the fluid toward central portion 66 of flow cap 32 includes directing the fluid substantially radially toward central portion 66 of flow cap 32.

According to some embodiments of the method, directing the fluid toward interior portion 50 of filter element 16 includes directing the fluid substantially in a first direction, and directing the fluid from exterior portion 52 of filter element 16 includes directing the fluid substantially in a second direction different than the first direction. For example, the first and second directions may be opposite to one another, or the first and second directions may be angled (e.g., oblique or perpendicular) with respect to one another. According to some embodiments, the method may also include preventing flow communication between fluid received from inlet port 38 of filter base 12 and fluid received in outlet port 40 of filter base 12 unless the fluid passes through filter element 16. The exemplary embodiment of filter assembly 10 shown in FIGS. 1-7 could be used to perform these exemplary methods.

As shown in FIG. 2, exemplary filter assembly 10 includes a collection bowl 108 coupled to second end 44 of canister 14 remote from flow cap 32. Collection bowl 108 is configured to receive at least a portion of a fluid separated from another fluid as the fluid passes through filter element 16 (e.g., water separated from fuel). According to some embodiments, a seal member 109 may be pressed against collection bowl 108 when filter element 16 is coupled to collection bowl 108 via canister 14 to provide a fluid-tight barrier between canister 14 and collection bowl 108.

Exemplary canister 14, filter element 16, and/or flow cap 32 may define a cross-section that is substantially circular, substantially oval-shaped, and/or substantially polygonal. According to some embodiments, the cross-sections may be substantially constant along the longitudinal length of canister 14 and/or filter element 16. According to some embodiments, the cross-sections may vary along the longitudinal length of canister 14 and/or filter element 16. The cross-sections may be chosen based on various considerations, such as, for example, the size and shape of the available space at a location of a machine that receives filter assembly 10.

As shown in FIGS. 2-4, exemplary filter assembly 10 includes first end cap 92 coupled to a first end of filter element 16. For example, first end cap 92 includes a top plate 110, and top plate 110 is coupled to a first end 112 of a tubular member 114 of filter element 16. Exemplary filter element 16 also includes a second end cap 116 including a bottom plate 118 coupled to a second end 120 of tubular member 114. For example, first end cap 92 includes a flange 122 configured to engage first end 112 of tubular member 114, and second end cap 116 includes a flange 124 configured to engage second end 120 of tubular member 114. In the exemplary embodiment shown, tubular member 114 extends through interior portion 50 of filter element 16.

In the exemplary embodiment of filter assembly 10 shown, exemplary filter element 16 includes filter media 126 configured to promote separation of a first fluid from a second fluid having different characteristics than the first fluid as fluid passes through filter media 126. According to some embodiments, first end cap 92 is associated with a first end of filter media 126 (e.g., first end cap 92 is coupled to a first end of filter media 126), and second end cap 116 is associated with a second end of filter media 126 (e.g., second end cap 116 is coupled to a second end of filter media 126). Exemplary filter element 116 includes tubular member 114, for example, as shown in FIGS. 2-4, extending between first end cap 92 and second end cap 116, wherein tubular member 114 includes a plurality of apertures 128 providing flow communication between interior portion 50 of filter element 16 and filter media 126. As shown, filter media 126 extends between first end cap 92 and second end cap 116 and around an exterior surface 130 of tubular member 114. In the exemplary filter assembly 10 shown, flow cap 32 is associated with first end cap 92 of filter element 16. Inlet portion 54 of flow cap 32 is configured to provide flow communication between inlet port 38 of filter base 12 and tubular member 114 of filter element 16. Outlet portion 58 of flow cap 32 is configured to provide flow communication between outlet port 40 of filter base 12 and exterior portion 52 of filter element 16.

In the exemplary embodiment shown, tubular member 114 has a longitudinal axis and extends between first end cap 92 and second end cap 116, and the longitudinal axis of tubular member 92 is substantially parallel to (e.g., substantially co-linear with) longitudinal axis X of filter assembly 10.

In the exemplary embodiment shown in FIGS. 2-7, filter media 126 is configured to promote separation of a first fluid from a second fluid having different characteristics than the first fluid as fluid passes through filter media 126. For example, filter media 126 may be configured to promote separation of water from fuel as fuel including at least a small percentage of water passes through filter media 126. For example, filter media 126 may include a filtration substance that tends to coalesce water as the fluid containing water passes from interior portion 50 to exterior portion 52 of filter element 16 (e.g., as the fluid containing water passes from one cylindrical surface to another). For example, filter media 126 may include paper- or foamed-based materials, which may include pleats. According to some embodiments, filter media 126 may be configured to capture particulate matter in fluid entering filter element 16 from filter base 12. According to some embodiments, filter element 16 may include a roving 132 (e.g., spirally-wrapped) configured to secure filter media 126 against tubular member 114. Although the exemplary embodiment shown includes spirally-wound roving 132, alternative ways to couple filter media 126 to tubular member 114 are contemplated.

As shown in FIGS. 2 and 3, exemplary filter media 126 extends between first end cap 92 and second end cap 116 and around an exterior surface 130 of tubular member 114, such that a space 134 (e.g., an annular space) exists between an exterior surface 136 of filter media 126 and an interior surface 138 of canister 14 when filter element 16 is received in canister 14. In the exemplary embodiment shown, fluid entering filter element 16 flows into interior portion 50 of filter element 16 (e.g., into tubular member 114). The fluid thereafter passes into filter media 126 (e.g., through apertures 128 of tubular member 114), through filter media 126 to exterior surface 136 of filter media 126. The fluid thereafter enters space 134 between interior surface 138 of canister 14 and exterior surface 136 of filter media 126.

As shown in FIGS. 2 and 3, canister 14 and second end cap 116 are configured such that at least a portion of fluid separated from the fluid entering filter assembly 10 flows from a first side 140 of second end cap 116 to a second side 142 of second end cap 116 opposite first end cap 92. For example, a gap between second end cap 116 and canister 14 may provide an annular opening or one or more passages providing flow communication between first side 140 and second side 142 of second end cap 116. For example, as the fluid flows through filter media 126, a portion of the fluid may tend to coalesce and become separated from the rest of the fluid (e.g., water may tend to coalesce and become separated from fuel). The portion separated from the remainder of the fluid may flow past second end cap 116 and collect in collection bowl 108. The remainder of the filtered fluid, or a second portion of the filtered fluid, may flow into space 134 and toward first end cap 92, and into outlet cavity 36 of flow cap 32 (see FIGS. 4 and 6) via outlet aperture 70 in plate 86. Once in outlet cavity 36, the filtered fluid flows into outlet port 40 of filter base 12. As a result of this exemplary configuration, the first portion of the fluid (e.g., water) flows from first side 140 of second end cap 116 to second side 142 of second cap 116, but does not flow into flow cap 32 via space 134. Rather, this portion of fluid flows into collection bowl 108 for collection. The second portion of the fluid flows from space 134 toward first end cap 92, through outlet portion 58 of flow cap 32, through outlet port 40, and, for example, back into a fuel system associated with a machine.

As shown in FIGS. 2 and 3, second end 44 of canister 14 includes a threaded portion 144 configured to be coupled to a complimentary threaded portion 146 of collection bowl 108. Seal member 109 is pressed against collection bowl 108 when canister 14 is coupled to collection bowl 108 to provide a fluid-tight barrier between canister 14 and collection bowl 108.

Figure 7:
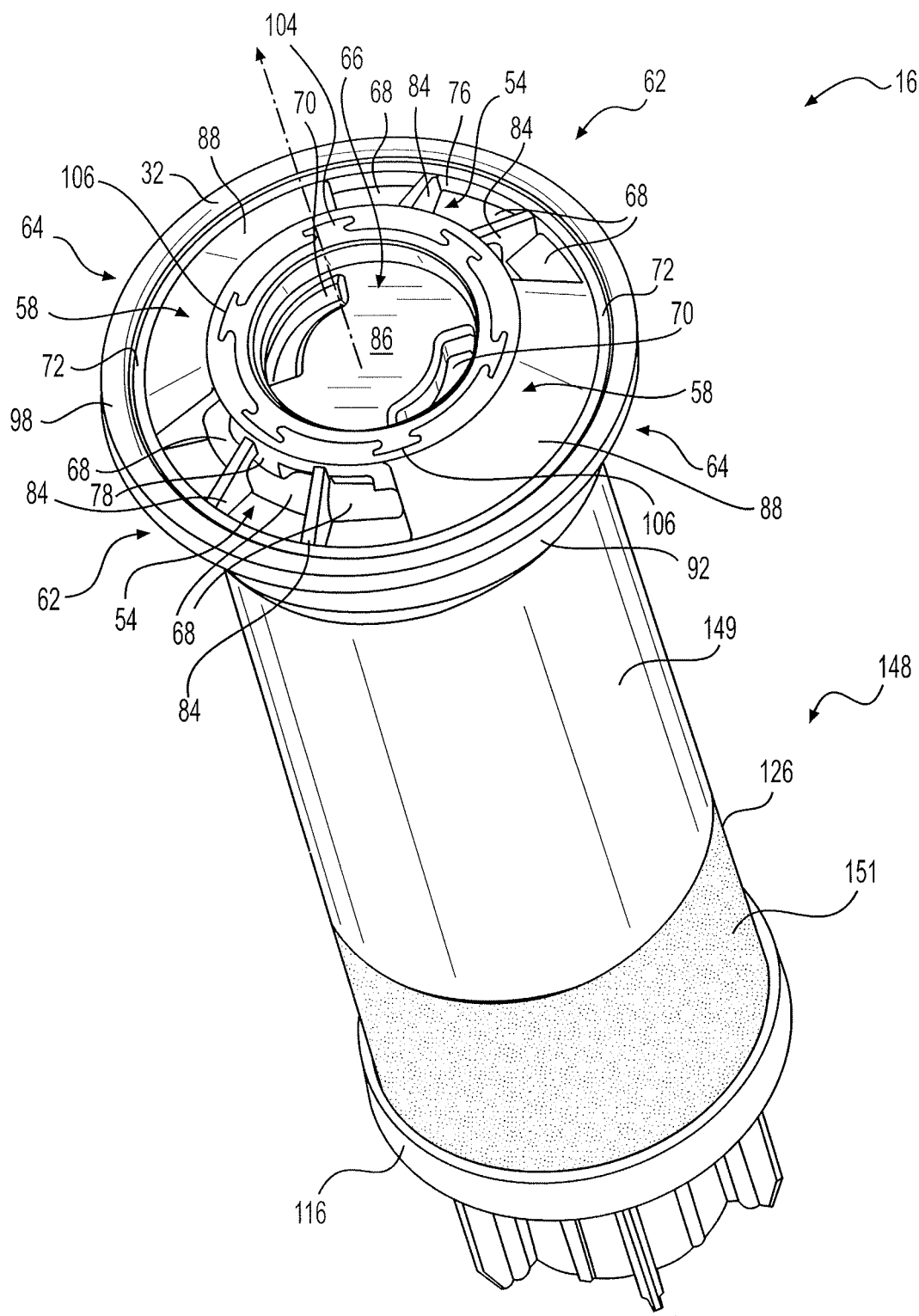
FIG. 7 is perspective view of an exemplary embodiment of a filter element.

According to some embodiments, filter assembly 10 may include an outer layer 148 at least partially covering exterior surface 136 of filter media 126 (see FIG. 7). For example, outer layer 148 may be wrapped around exterior surface 136 of filter media 126. According to some embodiments, outer layer 148 may cover roving 132 in embodiments having roving 132. In some embodiments, roving 132 may be radially exterior relative to outer layer 148, for example, holding outer layer 148 in place. Outer layer 148 may be configured to permit passage of a first fluid (e.g., fuel) through outer layer 148 and promote additional separation and/or coalescing of a second fluid (e.g., water), for example, such that the second fluid does not substantially pass through outer layer 148.

According to some embodiments, outer layer 148 may include one or more different types of material. For example, as shown in FIG. 7, an upper portion of outer layer 148 may include a barrier layer 149 configured to substantially permit the first fluid to pass therethrough while substantially preventing the second fluid from passing therethrough. A lower portion of the outer layer 148 may include a different type of material. For example, the lower portion of outer layer 148 may include a coalescing layer 151 configured to promote additional separation and/or coalescing of the first fluid from the second fluid. According to some embodiments, at least a portion (e.g., all of) outer layer 148 may include a mesh material, for example, configured to promote additional separation of a first fluid from a second fluid having different characteristics than the first fluid as fluid passes through outer layer 148. The mesh material may have, for example, a mesh size ranging from 50 micrometers to 500 micrometers. According to some embodiments, at least a portion of outer layer 148 includes filter media material, such as, for example, filter paper and/or filter foam. According to some embodiments, at least a portion of outer layer 148 may include synthetic ultra-high efficiency media. According to some embodiments, at least a portion of outer layer 148 may include a phobic media configured to promote separation of the first fluid and the second fluid from one another. For example, outer layer 148 may be configured to be hydrophobic, thereby tending to separate water from another fluid, such as, for example, fuel.

As shown in FIG. 7, some embodiments of outer layer 148 may cover less than the entire extent of exterior surface 136 of filter media 126. For example, outer layer 148 may cover at least 90%, at least 80%, at least 75%, at least 50%, at least 25%, at least 20%, or at least 10% of exterior surface 136. In the exemplary embodiment shown in FIG. 7, a first portion of outer layer 148 (e.g., barrier layer 149) is associated with exterior surface 136, such that barrier layer 149 extends about 80% from first end cap 92 toward second end cap 116, but does not extend to second end cap 116. Coalescing layer 151 extends the remaining 20% to second end cap 116. It is contemplated that outer layer 148 may instead extend from second end cap 116 toward first end cap 92, but not to first end cap 92. According to some embodiments, outer layer 148 may extend between first end cap 92 and second end cap 116, without reaching either first end cap 92 or second end cap 116. The extent to which outer layer 148 covers exterior surface 136 of filter media 126 may be tailored to achieve a desired level of a separation of the first fluid from the second fluid. According to some embodiments, outer layer 148 may cover the entire extent of exterior surface 136 of filter media 126. According to some embodiments, outer layer 148 may include more than one layer of material. It is contemplated that the different layers of outer layer 148 may be the same material or may be different types of material.

According to some embodiments, filter element 16 is configured such that fluid entering tubular member 114 via flow cap 32 flows in a first direction longitudinally toward second end cap 116 and thereafter into filter media 126. After the fluid passes into filter media 126, the first fluid (e.g., fuel) flows through filter media 126 and outer layer 148 (if present) and thereafter in a second direction between exterior surface 136 of filter media 126 and canister 14 in space 134 longitudinally toward flow cap 32. According to the exemplary embodiment shown, filter element 16 is configured such after the fluid passed into filter media 126, the second fluid (e.g., fluid separated from the first fluid) flows in substantially the first direction toward collection bowl 108.

According to some embodiments, filter assembly 10 may be used to separate a first fluid from a second fluid. For example, a method of separating a first fluid from a second fluid having different characteristics than the first fluid may include receiving fluid from inlet port 38 of filter base 12 in flow cap 32. The method may also include directing fluid received from inlet port 38 toward interior portion 50 of filter element 16 via flow cap 32. The method may also include directing fluid from interior portion 50 of filter element 16 into filter media 126 of filter element 16, wherein filter media 126 is configured to promote separation of the first fluid from the second fluid as fluid passes through filter media 126 to exterior portion 52 of filter element 16. The method may also include directing the first fluid from exterior portion 52 of filter element 16 to outlet port 38 of filter base 12 via flow cap 32. The method may also include directing at least a portion of the second fluid from filter media 126 to collection bowl 108. According to some embodiments of the method, directing fluid received from inlet port 38 toward interior portion 50 of filter element 16 includes directing the fluid substantially toward central portion 66 of flow cap 32, and directing fluid from exterior portion 52 of filter element 16 to outlet port 40 of filter base 12 includes directing the fluid substantially toward central portion 66 of flow cap.

According to some embodiments of the method, flow cap 32 has a substantially circular cross-section perpendicular to a longitudinal axis of flow cap 32, and directing the fluid toward central portion 66 of flow cap 32 includes directing the fluid substantially radially toward central portion 66 of flow cap 32. According to some embodiments of the method, directing the fluid toward interior portion 50 of filter element 16 includes directing the fluid substantially in a first direction, and directing the fluid from exterior portion 52 of filter element 16 includes directing the fluid substantially in a second direction different than the first direction (e.g., in an opposite direction). The exemplary embodiment of filter assembly 10 shown in FIGS. 1-7 could be used to perform these exemplary methods.

As shown in FIGS. 2 and 3, exemplary filter assembly 10, canister 14, and filter element 16 may be configured to remove at least a portion of water (and particulates) from fuel passing through filter element 16. For example, fluid for filtration enters filter element 16 via inlet port 38 of filter base 12 and inlet cavity 34, and thereafter flowing through one or more inlet apertures 68 of one or more inlet portions 54 of flow cap 32. Inlet apertures 68 are configured to direct fluid into interior portion 50 of filter element 16. For example, inlet apertures 68 may be configured to direct fluid into tubular member 114 and through apertures 128 of tubular member 114 and into filter media 126, which promotes separation of water from fuel in the fluid (e.g., it coalesces the water as is passes through filter media 126). The fuel exits filter media 126 and enters space 134 between exterior surface 136 of filter media 126 and interior surface 138 of canister 14. According to some embodiments, the fuel passes through outer layer 148, which is configured to coalesce any water that did not coalesce via filter media 126. Water in the fluid at least partially coalesces into water droplets, drops down between second end cap 116 of filter element 16 and canister 14, where it collects in collection bowl 108. Fuel separated from the fluid travels in space 134 toward and into outlet portion 58 of flow cap 32, where it passes via one or more of outlet apertures 70 into outlet cavity 36. Thereafter, the filtered fuel flows through outlet port 40 of filter base 12 and back into the fuel system of the machine.

Figure 1:
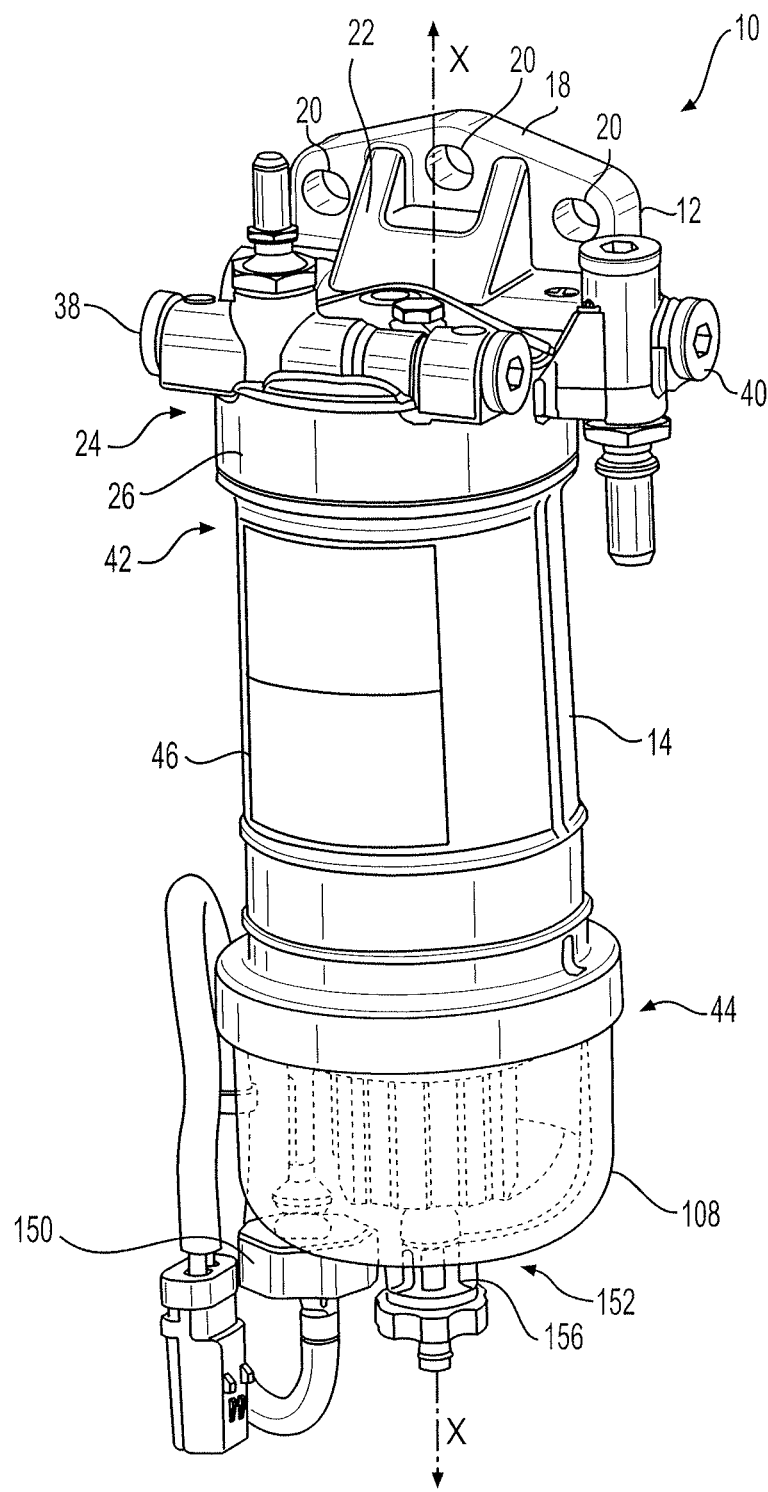
FIG. 1 is a perspective view of an exemplary embodiment of a filter assembly.

As shown in FIGS. 1-3, at least portions of collection bowl 108 may be configured such that it is possible to determine the level of the fluid in collection bowl 108. For example, at least a portion of collection bowl 108 (e.g., all of collection bowl 108) may be clear or translucent, so that it is possible to determine the level of water in collection bowl 108. This may permit an operator or service technician to determine whether it might be advisable to remove the fluid from collection bowl 108. This may substantially prevent enough water from accumulating in collection bowl 108 to be carried up into space 134, through outlet apertures 70 of flow cap 32 and outlet port 40 of filter base 12, and into the fuel system downstream of filter assembly 10. According to some embodiments, a sensor 150 may be provided to sense whether water should be removed from collection bowl 108. Sensor 150 may be replaced with a plug. Some embodiments of filter assembly 10 may include a drain 152 including a drain hole 154 and a drain plug 156 configured to facilitate removal of fluid (e.g., water) from collection bowl 108.

According to some embodiments, flow cap 32 or first end cap 92 may not be coupled directly to filter media 126 and/or tubular member 114. For example, embodiments consistent with the exemplary embodiments shown in FIGS. 1-7 may include any apparatus or device configured to establish fluid seals between filter element 16 and outlet port 40 of filter base 12, such as, for example, an adaptor configured to couple a "spin-on" type filter element with filter base 12 via a threaded spin-on connection. For example, flow cap 32 may be modified to include a threaded sleeve configured to engage an upper portion of a "spin-on" filter element and thereby couple the "spin-on" filter element to filter base 12 in a manner at least similar to exemplary flow cap 32.

INDUSTRIAL APPLICABILITY

The exemplary flow caps and filter assemblies of the present disclosure may be applicable to a variety of fluid systems. For example, the flow caps and filter assemblies may be applicable to power systems, such as, for example, compression-ignition engines, gasoline engines, gaseous-fuel powered engines, and other internal combustion engines known in the art. For example, the flow caps and filter assemblies may be used in a fuel system, for example, to separate water from fuel and/or remove particulate matter from fuel prior to being supplied to an engine. Use of the disclosed flow caps and filter assemblies may result in a more desirable level of filtration and/or separation of water from fuel, even in circumstances where water may be particularly difficult to separate from fuel.

According to some embodiments, filter assembly 10 including filter element 16 and flow cap 32 may provide improved separation by virtue of, for example, the flow paths of the fuel and water mixture and the separated fuel and water. For example, according to some embodiments, filter media 126 may act to coalesce water as fuel including at least a small percentage of water passes through filter media 126 and, according to some embodiments, outer layer 148. Thereafter, coalesced water droplets and fuel may flow in substantially opposite directions, with the fuel flowing toward flow cap 32 and water separated from the fuel flowing toward collection bowl 108. As a result of flowing in opposite directions, at least in part, additional separation of the water from fuel may be promoted as the water travels downward into collection bowl 108. Further, in embodiments including outer layer 148, outer layer 148 serves to further promote separation of any water remaining in the fuel as the fuel passes through outer layer 148 after passage through filter media 126. For example, outer layer 148 may be hydrophobic, and thus, may tend to prevent water from passing through outer layer 148, while allowing the fuel to pass through more easily.

As a result, according to some embodiments, the disclosed flow caps and filter assemblies may improve the separation of water from fuel, for example, when water is emulsified in the fuel and/or when the fuel contains bio-components. According to some embodiments, the methods may serve a similar purpose.

It will be apparent to those skilled in the art that various modifications and variations can be made to the disclosed, exemplary flow caps, filter elements, filter assemblies, and methods. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A filter assembly comprising:
a filter base;
a canister coupled to the filter base and having a longitudinal axis; and
a filter element received in the canister, the filter element including:
filter media that separates fuel from water as the fuel passes through the filter media;
a first end cap positioned at a first end of the filter media;
a second end cap positioned at a second end of the filter media; and
a tubular member extending between the first and second end caps, wherein the tubular member includes a plurality of apertures, and wherein the filter media extends between the first end cap and the second end cap and around an exterior surface of the tubular member; and
a flow cap abutting against the first end cap of the filter element, the flow cap including:
an inlet portion constructed to provide flow communication between an inlet port of the filter base and the tubular member of the filter element; and
an outlet portion constructed to provide flow communication between an outlet port of the filter base and an exterior portion of the filter element, wherein the flow cap has a substantially circular cross-section perpendicular to a longitudinal axis of the flow cap and wherein the inlet portion of the flow cap and the outlet portion of the flow cap are located at circumferentially different positions relative to a central portion of the flow cap, and wherein:
the flow cap includes an outer ring and an inner ring connected with the outer ring,
the inlet portion of the flow cap includes a first portion of the outer ring and a first portion of the inner ring,
the outlet portion of the flow cap includes a second portion of the outer ring and a second portion of the inner ring,
the flow cap further includes a plate connected to the inner ring,
the plate includes an outlet aperture in fluid communication with the outlet portion of the flow cap, and
the flow cap further includes a wall extending between the second portion of the outer ring and the second portion of the inner ring.

2. The filter assembly of claim 1, further including an outer layer at least partially covering an exterior surface of the filter media, wherein the outer layer includes one or more types of materials that permit passage of the fuel through the outer layer and separate the water from the fuel, such that the water does not pass through the outer layer.

3. The filter assembly of claim 2, wherein the filter media includes a pleated filter media, and the outer layer includes at least one of a barrier layer, a coalescing layer, a mesh layer, filter media, synthetic ultra-high efficiency media, or a phobic media constructed to separate the fuel and the water.

4. The filter assembly of claim 1, further including a collection bowl coupled to an end of the canister remote from the flow cap, wherein the collection bowl is arranged to receive at least a portion of the water when water is separated from the fuel.

5. The filter assembly of claim 4, wherein the filter element is constructed such that fuel combined with water entering the tubular member via the flow cap flows in a first direction longitudinally toward the second end cap and thereafter into the filter media, and wherein after the fuel combined with water passes into the filter media, the fuel separated from the water flows in a second direction between the exterior of the filter media and the canister longitudinally toward the flow cap.

6. The filter assembly of claim 5, wherein the filter element is constructed such that after the fuel combined with water passes into the filter media, water separated from the fuel flows in the first direction toward the collection bowl.

7. A filter assembly comprising:
a filter base;
a canister coupled to the filter base and having a longitudinal axis;
a filter element received in the canister, the filter element including:
filter media including a filtration substance that separates fuel from water as the fuel passes through the filter media, wherein the filter media includes an interior portion and an exterior portion;
a first end cap positioned at a first end of the filter media; and
a second end cap positioned at a second end of the filter media;
a flow cap abutting against the first end cap of the filter element, the flow cap including:
an inlet portion constructed to provide flow communication between an inlet port of a filter base and the interior portion of the filter media; and
an outlet portion constructed to provide flow communication between an outlet port of the filter base and an exterior portion of the filter media; and
a collection bowl coupled to an end of the canister remote from the flow cap, wherein the collection bowl is arranged to receive at least a portion of water separated from the fuel,
wherein the filter element is arranged such that fuel entering the interior portion of the filter media via the flow cap flows in a first direction longitudinally toward the second end cap and thereafter into the filter media, and wherein after the fuel passes into the filter media, the fuel flows in a second direction between the exterior of the filter media and the canister longitudinally toward the flow cap, wherein the flow cap has a substantially circular cross-section perpendicular to a longitudinal axis of the flow cap and wherein the inlet portion of the flow cap and the outlet portion of the flow cap are located at circumferentially different positions relative to a central portion of the flow cap, wherein the flow cap includes an outer ring and an inner ring connected with the outer ring and located in an interior position relative to the outer ring, wherein the inlet portion of the flow cap includes a first portion of the outer ring and a first portion of the inner ring, and wherein the outlet portion of the flow cap includes a second portion of the outer ring and a second portion of the inner ring, wherein the flow cap further includes a plate connected with the inner ring, wherein the plate includes an outlet aperture in fluid communication with the outlet portion of the flow cap, and wherein the flow cap further includes a wall extending between the second portion of the outer ring and the second portion of the inner ring.

8. The filter assembly of claim 7, wherein the filter element further includes a tubular member extending between the first and second end caps, wherein the tubular member includes a plurality of apertures, and the filter media extends between the first end cap and the second end cap and around an exterior surface of the tubular member.

9. The filter assembly of claim 7, wherein the filter base is constructed to be coupled to a machine, wherein the filter base includes an inlet port and an outlet port, and wherein the flow cap is sealingly engaged with the filter base, such that the inlet portion of the flow cap provides flow communication between the inlet port of the filter base and the interior portion of the filter media, and the outlet portion of the flow cap provides flow communication between the outlet port of the filter base and the exterior portion of the filter media.

10. The filter assembly of claim 9, further including a seal element engaged with the flow cap and positioned to provide a fluid seal between the flow cap and at least one of the filter base and the canister.

11. The filter assembly of claim 9, further including a seal element engaged with the flow cap and positioned to prevent flow of fluid between the inlet port of the filter base and the outlet port of the filter base unless the fluid passes through the filter element.

* * * * *